United States Patent [19]

Krause et al.

[11] Patent Number: 4,872,769

[45] Date of Patent: Oct. 10, 1989

[54] FRICTION BEARING SYSTEM FOR A RAPIDLY ROTATING SHAFT

[75] Inventors: Hans Krause, Bad Nauheim; Rudi Röss; Helmut Koch, both of Bruchköbel, all of Fed. Rep. of Germany

[73] Assignee: Leybold Aktiengesellschaft, Hanau, Fed. Rep. of Germany

[21] Appl. No.: 267,245

[22] Filed: Nov. 4, 1988

[30] Foreign Application Priority Data

Sep. 6, 1988 [DE] Fed. Rep. of Germany ....... 3830181

[51] Int. Cl.$^4$ ................ F16C 35/10; G02B 26/04
[52] U.S. Cl. .................... 384/226; 350/274; 384/446
[58] Field of Search ............. 350/273, 274; 384/192, 384/201, 205, 226, 227, 238, 247, 257–259, 446, 627, 907.1

[56] References Cited

U.S. PATENT DOCUMENTS

| | | | |
|---|---|---|---|
| 4,149,365 | 4/1979 | Kobayashi et al. | 384/227 |
| 4,152,594 | 5/1979 | Schunck et al. | 250/343 |
| 4,655,616 | 4/1987 | Ducan | 384/446 |
| 4,719,352 | 1/1988 | Miyatake et al. | 350/274 X |
| 4,773,210 | 9/1988 | Landwehrkamp et al. | 384/446 X |

*Primary Examiner*—Thomas R. Hannon
*Attorney, Agent, or Firm*—Felfe & Lynch

[57] ABSTRACT

In a friction bearing system for a rapidly rotating shaft of an apparatus for measuring the optical absorption of a sample under analysis by way of an optical radiation source projecting a beam on the sample, the chopper system for the periodical interruption of the beam includes a rotatably mounted chopper disk provided with light-admitting openings and a controlled-speed drive system, as well as a radiation detector for the light affected by the sample. Both ends of the shaft fixedly joined to the chopper disk are provided with pivots corresponding to bushes, one of which is held by a spider which is affixed to the housing part that holds the other bush. The spider is provided with a bore running at an angle to the shaft, and the longitudinal axis of this bore intersects the axis of rotation of the shaft. A magnet is held for longitudinal displacement in the bore and its field acts upon a ring disposed on the shaft in order to assure the quiet and wear-free spinning of the chopper disk.

5 Claims, 3 Drawing Sheets

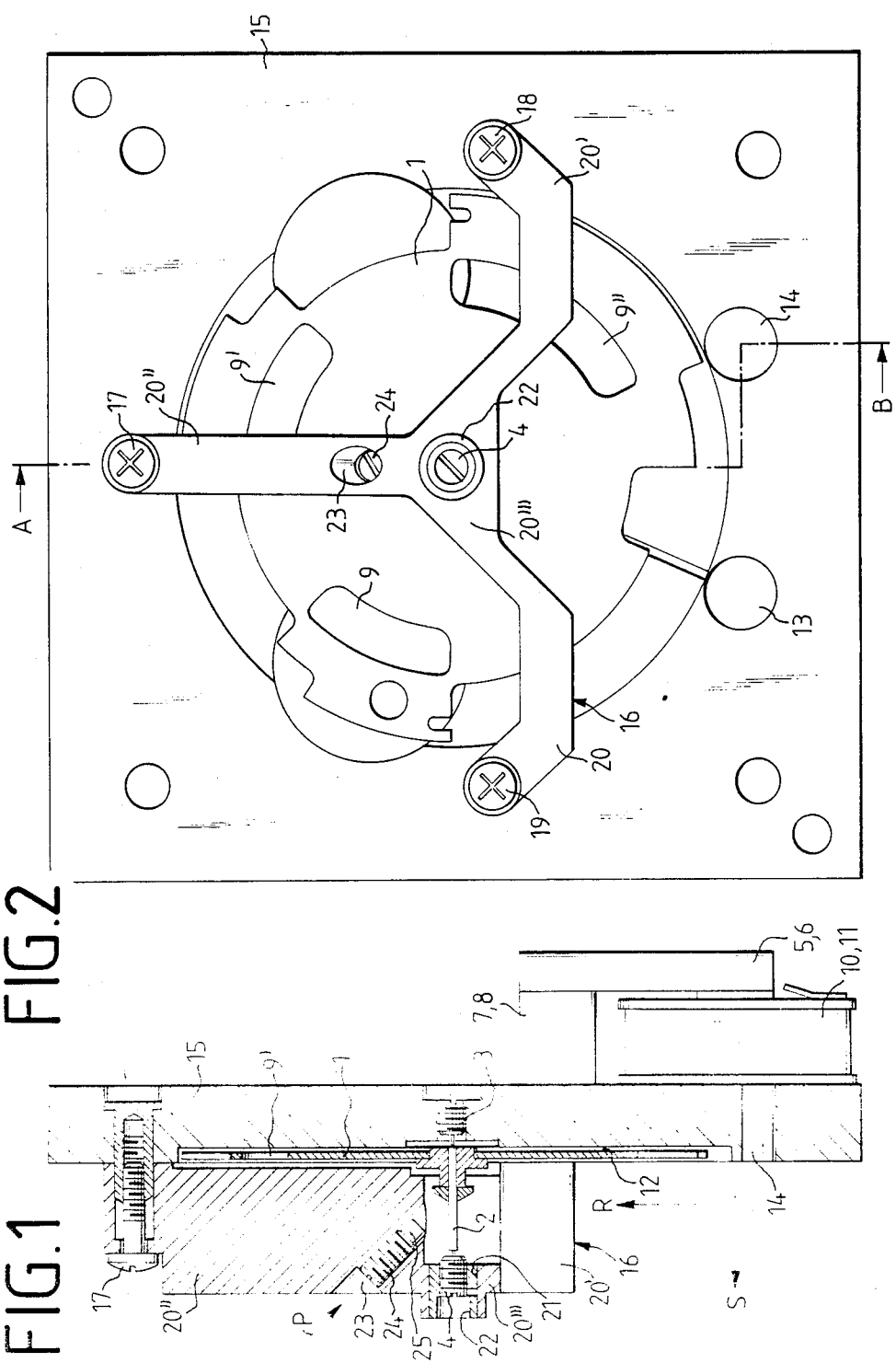

FRICTION BEARING SYSTEM FOR A RAPIDLY ROTATING SHAFT

The invention relates to a rapidly rotating shaft, especially for an apparatus for the measurement of the optical absorption of a sample under analysis. Such an apparatus has an optical source of radiation for projecting a beam onto the sample, a chopper system for the periodical interruption of the beam including a rotatably mounted chopper disk provided with openings for the passage of light, and a controlled-speed drive system, as well as a radiation detector for the measuring of the light affected by the sample.

A friction bearing system of the kind in question is known, in which the shaft of the chopper disk runs in fixed bearings having bushes for the pivots of the shaft, which are adjustable to a certain extent lengthwise of the shaft in order to reduce the free play of the bearing (DE 26 08 669) corresponding to U.S. Pat. No. 4,152,594 and to assure easy rotation. This known bearing system, however, has the disadvantage that defects in the two bearing bores or inaccuracies in making the pivot pin lead especially to a radial free play which cannot be eliminated by the mere adjustment of the bearing bushes in the lengthwise direction. Furthermore, the axial play of the bearing must not be made too small with the known system, since otherwise a change of temperature can cause the shaft to bind in the bearing and stop the chopper wheel.

It is the purpose of the present invention to create a bearing system which will permit the completely quiet and wear-free rotation of a chopper disk.

This purpose is accomplished in accordance with the invention in that both ends of the shaft affixed to the chopper disk have pivots which correspond with bearing bushes of which one is held by a spider which is affixed to the part of the housing which holds the other bearing bush, while the spider is provided with a bore running at an angle to the shaft, whose longitudinal axis intersects the axis of rotation of the shaft, and a magnet is held in the bore on a longitudinally displaceable part, and its magnetic field acts upon a ring of metallic material—soft iron for example—disposed on the shaft.

Preferably the spider is made up of a central portion holding the bush and three arms extending radially outward from the central portion, the free ends of the arms being screwed, riveted or cemented to the housing part.

Advantageously, one of the arms of the spider extending approximately star-wise outwardly from the central portion is provided with a bore which is at an angle $\alpha$ of 45° or less to the plane of the arms, and whose long axis intersects the long axis of the bore disposed in the central portion for the bearing, in an area between the two bearings. Additional features and details of the invention are described and specified in the claims.

The invention admits of a great variety of embodiments; one of them is represented schematically in the appended drawings wherein:

FIG. 1 is a section through a part of the housing of the apparatus, taken along the lines A-B of FIG. 2, showing the spider, the chopper disk, and the one pair of pole pieces;

FIG. 2 is a plan view of the one housing part of the apparatus with the chopper disk and spider;

Figure 3:
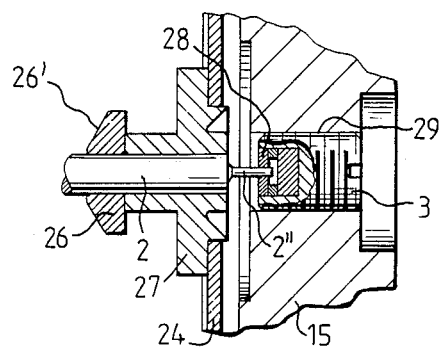
FIG. 3 is an enlarged, fragmentary sectional view of one of the two adjustable bearings for the pivot of the chopper disk of FIGS. 1 and 2.
Figure 4:
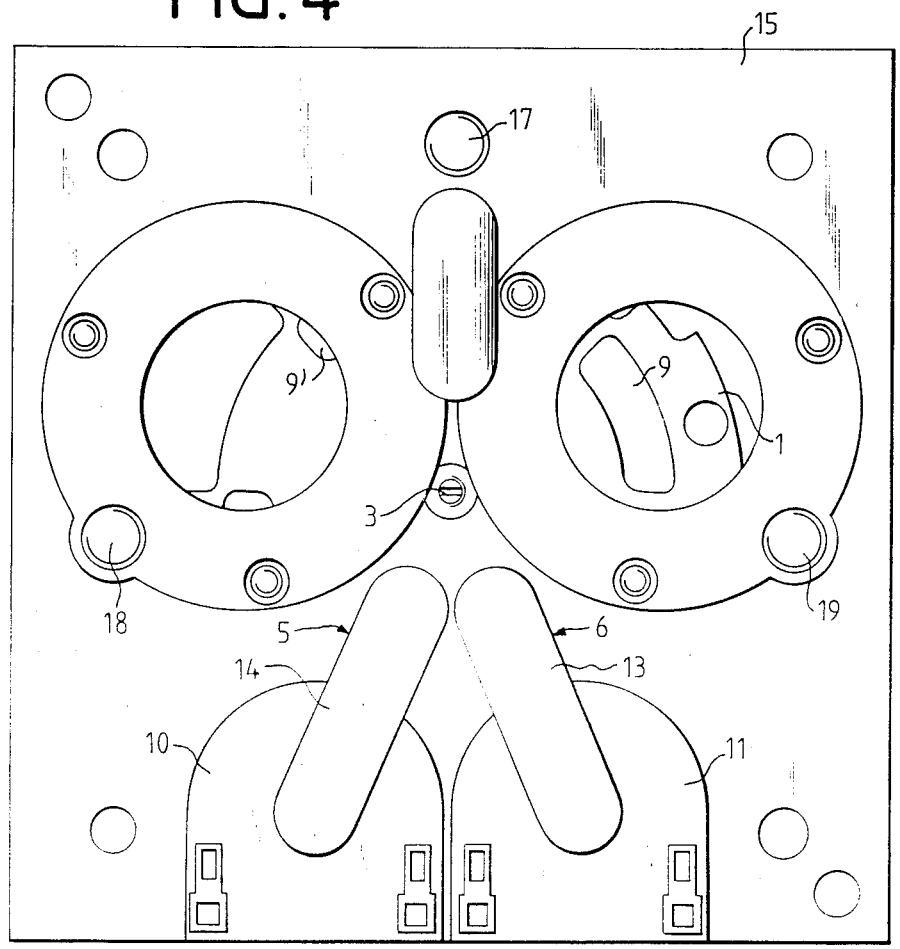
FIG. 4 is a plan view of the one part of the housing of the apparatus, as seen from the outside.

FIG. 1 shows a chopper disk 1 consisting of aluminum, which has a thickness of, for example, about 0.5 mm, and is rotatably mounted on a shaft 2 in the bearings 3 and 4. This is a jeweled bearing, as known in the art of manufacturing fine mechanisms. In the chopper disk 1, several—three, for example—openings 9, 9', 9", uniformly distributed on the circumference, are provided, which in conjunction with the solid parts of the disk 1 between them produce the actual chopping of the light at a frequency determined by the product of the rotatory speed of the disk and the number of openings.

The apparatus represented is designed for a chopper frequency between about 50 Hz and about 500 Hz. It can easily be used, however, also for very low frequencies of several hertz and frequencies in the kilohertz range.

With the chopper disk 1 there are associated two alternating current magnets 5 and 6, whose essential parts are cores which are either low-loss ferrite cores or laminated iron cores.

The magnetic cores have four pole pieces 7 and 8 (FIG. 2) of which only one pair is shown, and which form an air gap 12. On the yoke of each core there is a winding 10 and 11, respectively. The alternating current magnets 5 and 6 reach around the chopper disk 1 with their pole pieces 7 and 8 outside of the axis of rotation or shaft 2 and outside of the path rotation of openings 9, 9', 9", the expression "outside of the path of rotation" being understood to refer also and especially to the radial area between shaft 2 and openings 9, 9', 9".

Alternating currents are supplied to the windings 10 and 11, and, in accordance with the above explanations, they have a given or variable relative phasing. Due to the physical arrangement of the chopper disk 1 and the alternating-current magnets 5 and 6, eddy currents are induced in the disk 1, which in accordance with the above explanations, produce torque by which the chopper disk 1 can be set in rotation and/or can be retarded. A detailed description of the driving of the chopper disk 1 is to be found in German Federal Patent 26 08 669.

Figure 5:
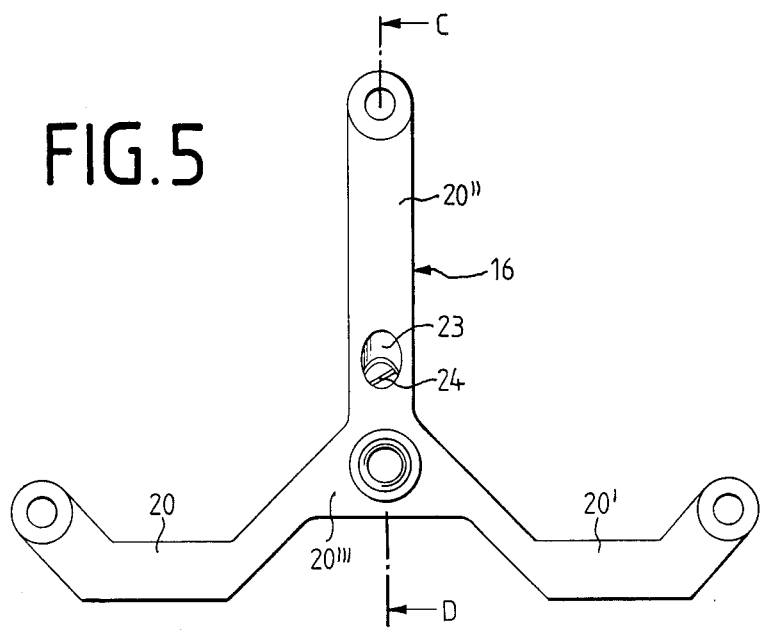
FIG. 5 is a plan view of the spider.
Figure 6:
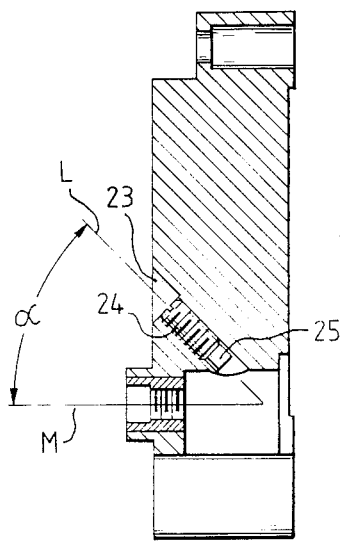
FIG. 6 is a section taken through the spider of FIG. 5 along the lines C-D.

Inasmuch as it is of great importance to the operation, useful life and performance of the apparatus, for example for measuring the optical absorption of a solid, liquid or gaseous sample, that the chopper disk 1 be mounted so as to be free of wear, largely free of friction, and especially free of vibration and free play, a spider 16 is affixed to the one housing part 15 by means of three screws 17, 18 and 19, and is shown in greater detail in FIGS. 5 and 6. This spider 16 has three arms 20, 20' and 20" which extend radialy outward from a central portion 20'''. The central portion 20''' is provided with a bore 21 into which a bush 22 is pressed, which in turn contains the bearing 4 having a screw thread. The upwardly extending arm 20" has a bore 23 whose long axis L intersects the longitudinal bore M extending through the bore 21 in the central portion 20''' at an angle $\alpha$ of about 45°. A thread is cut in bore 23, and into it is inserted the centering screw 24 which bears a permanent magnet 25 on its end pointing toward the axis of rotation 2. As seen in FIG. 3, the shaft is affixed at its end adjacent the housing part 15 to a ring 26 whose side facing the centering screw 24 is of a conical shape, the conical face 26' running approximately transversely of the long axis L of bore 23. A flange 27 is shrunk onto the shaft 2, and is in turn peened to the chopper disk 24. Shaft 2 is provided at both ends with pivots 2' and 2", pivot 2" being held at the end adjacent the housing part 15 in a jewel 28 which is part of the bearing 3 which is screwed into a tap 29 in the housing part 15. The bearing 4, which is screwed into the bush 22 of the spider 26, is similar in configuration to bearing 3. Axially, both bearings 3 and 4 can be adjusted very finely in their distance apart and in their distance from shaft 2; this adjustment alone, however, is not sufficient to assure the required quiet running of the chopper disk 1 and especially the required useful life of the assembly. The required play-free rotation is made possible for the first time by the magnet 25 on the centering screw 24. When the magnet 25 is appropriately shifted toward the flange or ring 26 of soft iron (arrow direction P), the magnetic field of the magnet 25 acts so strongly on the shaft 2 with ring 26 and flange 27 that the shaft is pulled leftward in FIG. 1 in the direction of the arrow S, and at the same time upwardly in the direction of arrow R. Any axial or radial clearance that may possibly be still present in the bores of bearings 3 and 4 and pivots 2' and 2" of shaft 2 will be unable to produce any tendency toward rough running when the chopper disk 1 is rotating, since the shaft 2 is always urged unilaterally in the bearing bores of the magnetic forces acting on the ring 26. Since the arms 20, 20', 20", of the spider 16 are relatively long, the spider, and with it the bearing 4, will assume a perfectly tilt-free and vibration-free position in relation to the housing part 15, while any off-centering of the bore of the bearing 4 with respect to the bore of bearing 3 will be prevented. If the described apparatus is used in a measuring apparatus or analyzer, experience has shown that the chopper noise and chopper flutter are eliminated at all working temperatures by the fact that the small permanent magnet 25 (made, for example, from samarium cobalt) is disposed at an angle α to the shaft 2 and is vertically above the latter, acting against gravity so that the bearings 3 and 4 are relieved by the radial magnetic force from the force of gravity, and the substantially greater axial force resulting from this magnetic field geometry holds the chopper disk 1 in permanent contact with the thrust bearing 4.

Moreover, the eddy current losses in ring 26, which are produced by the rotation of disk 1 and hence of ring 26, and by the stationary magnetic field of the permanent magnet 25, damp the rotatory oscillation tendency of disk 1.

I claim:

1. In an apparatus for measuring the optical absorption ability of a sample under analysis with an optical radiation source for projecting a beam against the sample, a chopper system for the periodical interruption of the measuring beam, a speed-regulated drive system, and a radiation detector for the measuring light affected by the sample, a friction bearing system for a rapidly rotating shaft comprising a chopper disk provided with light passage openings, a shaft affixed to the chopper disk and having pivots at two ends thereof, two bushes, a spider holding one bush and being affixed to a housing part holding the other bush, the spider being provided with a bore running at an angle to the shaft, the longitudinal axis of the bore intersecting the axis of rotation of the shaft, a longitudinally displaceable part and a magnet held in the bore on the longitudinally displaceable part, a ring of magnetic material which is disposed on the shaft, the magnet having a magnetic field acting on the ring of magnetic material.

2. Friction bearing system accordng to claim 1, in which the spider has a central portion receiving the one bush and the spider having three arms extending radially outwardly from the central portion in one plane, the free ends of the arms being attached to the housing part.

3. Friction bearing system according to claim 2, in which one of the arms of the spider extending outwardly somewhat star-wise from the central portion has the bore which intersects the axis of rotation of the shaft and runs at an angle α of 45° or less to the plane of the arms and which spider has a bore disposed in the central portion for the one bush and in which spider the longitudinal axis of the bore at the angle α intersects the longitudinal axis of the bore disposed in the central portion for the one bush, in an area between the two bushes.

4. Friction bearing system according to claim 3, in which the ring is rotationally symmetrical and fixedly disposed on the shaft and has the configuration of a truncated cone, the longitudinal axis of the bore at the angle α which is threaded for the longitudinally displaceable part which is a screw and is provided with the magnet being aimed approximately at right angles to a conical surface of the ring.

5. Friction bearing system according to claim 4, in which the magnet is made integral with the screw and the latter, after insertion into the threaded bore, is attached to the spider.

* * * * *